(12) United States Patent
Wu et al.

(10) Patent No.: US 10,716,051 B2
(45) Date of Patent: Jul. 14, 2020

(54) METHOD AND APPARATUS FOR TRANSMITTING D2D DISCOVERY SIGNAL AND COMMUNICATION SYSTEM

(71) Applicant: FUJITSU CONNECTED TECHNOLOGIES LIMITED, Kawasaki-shi, Kanagawa (JP)

(72) Inventors: Lianhai Wu, Beijing (CN); Tao Qiu, Beijing (CN); Haibo Xu, Beijing (CN); Hua Zhou, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/173,010

(22) Filed: Jun. 3, 2016

(65) Prior Publication Data
US 2016/0286465 A1    Sep. 29, 2016

Related U.S. Application Data

(63) Continuation of application No. PCT/CN2013/088770, filed on Dec. 6, 2013.

(51) Int. Cl.
*H04W 48/08* (2009.01)
*H04W 72/04* (2009.01)
(Continued)

(52) U.S. Cl.
CPC ........... *H04W 48/08* (2013.01); *H04W 8/005* (2013.01); *H04W 72/04* (2013.01); *H04W 72/044* (2013.01); *H04W 76/14* (2018.02)

(58) Field of Classification Search
CPC ........... H04W 16/02–12; H04W 28/02; H04W 28/0205; H04W 28/0215; H04W 28/0247;
(Continued)

(56) References Cited

U.S. PATENT DOCUMENTS

| 8,121,097 | B2 | 2/2012 | Li et al. | |
| 2009/0003274 | A1* | 1/2009 | Kwak | H04W 72/042 370/329 |

(Continued)

FOREIGN PATENT DOCUMENTS

| CN | 101355724 A | 1/2009 |
| CN | 103338497 A | 10/2013 |

(Continued)

OTHER PUBLICATIONS

International Search Report issued for corresponding International Patent Application No. PCT/CN2013/088770 dated Feb. 27, 2014, with an English translation.

(Continued)

*Primary Examiner* — Allahyar Kasraian
(74) *Attorney, Agent, or Firm* — Myers Wolin, LLC

(57) ABSTRACT

Embodiments of the present disclosure provide a method and apparatus for transmitting a D2D discovery signal and a communication system. The method for transmitting includes: a UE selects a part of resources from a resource pool for transmitting a D2D discovery signal; the part of resources are selected in a manner of limiting number of times of transmission, or in a manner of limiting time interval, or in a manner of calculating a resource position; and transmits the D2D discovery signal by using the selected part of resources. With the embodiments of the present disclosure, malignant competitions may be avoided, resource utilization may be improved, and probabilities of undiscovery between UEs may be lowered; or detection may performed accurately, and complexity of a UE may be lowered.

8 Claims, 5 Drawing Sheets

(51) Int. Cl.
*H04W 8/00* (2009.01)
*H04W 76/14* (2018.01)

(58) Field of Classification Search
CPC ......... H04W 28/0252; H04W 28/0278; H04W 28/16; H04W 28/18; H04W 28/26; H04W 72/005; H04W 72/02; H04W 72/04; H04W 72/044; H04W 72/0446; H04W 72/12; H04W 72/1205; H04W 72/121; H04W 72/1257
USPC ................ 455/434, 450–455, 509, 515, 516, 455/41.1–41.3; 370/322, 326, 329, 330, 370/336, 341, 345–350, 433, 437–444, 370/458–463, 498–545
See application file for complete search history.

(56) References Cited

U.S. PATENT DOCUMENTS

| | | | | |
|---|---|---|---|---|
| 2009/0149221 | A1* | 6/2009 | Liu | H04W 88/085 455/561 |
| 2009/0259910 | A1* | 10/2009 | Lee | H04L 1/18 714/748 |
| 2010/0150013 | A1* | 6/2010 | Hara | H04L 25/0224 370/252 |
| 2010/0240312 | A1 | 9/2010 | Peng et al. | |
| 2013/0155962 | A1 | 6/2013 | Hakola et al. | |
| 2014/0220985 | A1* | 8/2014 | Lin | H04W 72/082 455/444 |
| 2014/0302867 | A1* | 10/2014 | Mizusawa | H04W 16/16 455/452.1 |
| 2015/0057006 | A1* | 2/2015 | Gao | H04W 72/04 455/450 |
| 2015/0078466 | A1 | 3/2015 | Zhou et al. | |
| 2015/0351058 | A1* | 12/2015 | Seo | H04W 56/002 370/350 |
| 2016/0150391 | A1* | 5/2016 | Lee | H04W 56/002 370/329 |
| 2016/0150507 | A1* | 5/2016 | Kim | H04W 72/04 455/450 |
| 2016/0183276 | A1* | 6/2016 | Marinier | H04W 2/02 370/329 |
| 2016/0212793 | A1* | 7/2016 | Jung | H04W 36/0016 |
| 2016/0295595 | A1* | 10/2016 | Chae | H04W 72/00 |

FOREIGN PATENT DOCUMENTS

| | | |
|---|---|---|
| CN | 103379617 A | 10/2013 |
| CN | 103428679 A | 12/2013 |
| CN | 103428817 A | 12/2013 |
| JP | 2012-507974 A | 3/2012 |
| JP | 2016-536828 A | 11/2016 |
| RU | 2011142449 A | 4/2013 |
| WO | 2013/049959 A1 | 4/2013 |
| WO | 2015/065881 A1 | 5/2015 |

OTHER PUBLICATIONS

Written Opinion of the International Searching Authority issued for corresponding International Patent Application No. PCT/CN2013/088770, dated Feb. 27, 2014, with an English translation.
Extended European search report with supplementary European search report and the European search opinion ssued by the European Patent Office for corresponding European Patent Application No. 13898517.1, dated May 3, 2017.
Huawei et al: "Comparison of Type 1, Type 2a, and Type 2b Discovery Resource Allocation", Agenda Item: 7.5.1, 3GPP TSG-RAN WG2 Meeting #83bis, R2-133278, Ljubljana, Slovenia, Oct. 7-11, 2013.
CATT: "Considerations on D2D Discovery Resource Allocation", Agenda Item: 7.5.2, 3GPP TSG-RAN WG2 Meeting #84, R2-134062, Ljubljana, Slovenia, Oct. 11-15, 2013.

Notification of Reasons for Refusal issued by the Japan Patent Office for corresponding Japanese Patent Application No. 2016-536529, dated Jun. 13, 2017, with an English translation.
ZTE Corporation, "On resource allocation for D2D discovery", Agenda Item: 7.5.2, 3GPP TSG-RAN WG2 Meeting #84, R2-134212, San Francisco, USA, Nov. 11-15, 2013.
ETRI, "Resource allocation for D2D discovery", Agenda Item: 7.2.8.2.2, 3GPP TSG-RAN WG1 Meeting #74bis, R1-134336, Guangzhou, China, Oct. 7-11, 2013.
Examiner's Report and Examination Search Report issued for corresponding Canadian Patent Application No. 2932451 dated May 10, 2017.
Notice of Preliminary Rejection issued for corresponding Korean Patent Application No. 10-2016-7014170, dated Jul. 20, 2017, with an English translation.
Office Action issued by Rospatent Federal Service for Intellectual Property for corresponding Russian Patent Application No. 2016125847, dated Aug. 22, 2017, with an English translation.
Search Report issued by Rospatent Federal Service for Intellectual Property for corresponding Russian Patent Application No. 2016125847, dated Aug. 22, 2017 with an English translation.
ETRI—3GPP TSG RAN WG1, Meeting #75, San Francisco, USA, Nov. 11-15, 2013, R1-135279; "Discussion on resource allocation for D2D discovery", Agenda Item 6.2.8.2.2, Document for Discussion and Decision. [cited in Search Report for corresponding Russian Patent Application No. 2016125847, dated Aug. 22, 2017].
CATT—3GPP TSG RAN WG1, Meeting #75, San Francisco, USA, Nov. 11-15, 2013, R1-135089; "Further discussion on resource allocation for D2D discovery", Agenda Item 6.2.8.2.2, Document for Discussion and Decision. [cited in Search Report for corresponding Russian Patent Application No. 2016125847, dated Aug. 22, 2017].
Office Action issued by the Mexican Institute of Industrial Property for corresponding Mexican Patent Application No. MX/a/2016/007306, dated Jan. 12, 2018, with an English translation.
First Notification of Office Action issued by the State Intellectual Property Office of China for corresponding Chinese Patent Application No. 2013800806331, dated Sep. 5, 2018, with an English translation.
Report of Reconsideration by Examiner before Appeal issued by the Japan Patent Office for corresponding Japanese Patent Application No. 2016-536529, mailed on May 7, 2018, with an English translation.
Second Notice of Final Rejection issued by the Korean Intellectual Property Office for corresponding Korean Patent Application No. 10-2016-7014170, dated Aug. 18, 2018, with English translation.
Notice of Final Rejection issued by the Korean Intellectual Property Office for corresponding Korean Patent Application No. 10-2018-7027242, dated May 29, 2019, with an English translation.
Communication pursuant to Article 94(3) EPC issued by the European Patent Office for corresponding European Patent Application No. 13 898 517.1-1214, dated Jan. 22, 2019.
NTT DOCOMO, Inc.,"Evaluation of D2D discovery message and transmission for type 1 discovery", Agenda Item: 6.2.8.2.1, 3GPP TSG RAN WG1 Meeting #75, R1-135521, San Francisco, USA, Nov. 11-15, 2013.
Second Office Action issued by the China National Intellectual Property Administration for corresponding Chinese patent application No. 201380080633.1, dated Mar. 7, 2019 with an English translation.
Trial Decision issued by the Japan Patent Office for corresponding Japanese Patent Application No. 2016-536529, mailed on Apr. 16, 2019, with an English translation.
Notice of Preliminary Rejection issued for corresponding Korean Patent Application No. 10-2018-7027242, dated Nov. 28, 2018, with an English translation.
Decision of Rejection dated Jul. 22, 2019 issued in the corresponding Chinese application No. 201380080633.1, with full English translation of the Decision of Rejection attached.
Notification for Reexamination issued by the China National Intellectual Property Administration for corresponding Chinese Patent

(56) References Cited

OTHER PUBLICATIONS

Application No. 201380080633.1, dated Apr. 15, 2020, with an English translation.

* cited by examiner

"Related Art"

METHOD AND APPARATUS FOR TRANSMITTING D2D DISCOVERY SIGNAL AND COMMUNICATION SYSTEM

CROSS REFERENCE TO RELATED APPLICATIONS

This application is a continuation application of International Application PCT/CN2013/088770 filed on Dec. 6, 2013, the entire contents of which are incorporated herein by reference.

TECHNICAL FIELD

The present disclosure relates to the field of communications, and in particular to a method and apparatus for transmitting a device-to-device (D2D) discovery signal and a communication system.

BACKGROUND

A D2D communication method refers to that data packets are communicated by directly establishing a communication link between user equipments (UEs), such as a UE1 and a UE2, without needing via a core network, even without needing via a base station. FIG. 1 is a schematic diagram of D2D communications in the relevant art. As shown in FIG. 1, D2D communications may be performed between UE1 and UE2 under coverage of a base station (eNB1). However, if under coverage of a base station, control signaling of the UE1 and UE2 will be sent by the base station.

Before D2D direct communications can be established between UEs, a D2D discovery process, such as mutual discovery between the UE1 and the UE2, needs to be performed. For example, in order to achieve discovery of the UE1 by the UE2, the UE1 needs to transmit a D2D discovery signal, which may also be referred to as a beacon, in a time-frequency resource; and the UE2 may discover the D2D discovery signal transmitted by the UE1 by detecting the time-frequency resource. And quality of a channel from the UE1 to the UE2 may be known through signal detection.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

However, it was discovered by the inventors that according to a conclusion of a discussion of the current 3GPP, there exist the following problems in an existing discovery mechanism: when a large number of UEs need to transmit D2D discovery signals at a time period, they need to acquire time-frequency resources through contention; and when a UE cannot determine whether the D2D discovery signal is transmitted successfully, in order to improve a rate of success of transmission, the UE will frequently occupy a large number of resources through contention to transmit the D2D discovery signal, thereby resulting in malignant contention, and lowering resource utilization.

Furthermore, as simultaneous receiving and transmission in the same time-frequency resource cannot be performed by a UE, it is prone that some UEs always cannot discover each other. For example, a UE1 and a UE2 always transmit D2D discovery signals in the same time-frequency resource, and they cannot discover each other.

Furthermore, for a UE at a receiver end, the UE does not know a time-frequency resource where a UE it expects to discover transmits a D2D discovery signal. Hence, the UE at the receiver end will perform blind detection, thereby increasing complexity of the UE, and resulting in relatively large power consumption and insufficient power saving.

Embodiments of the present disclosure provide a method and apparatus for transmitting a D2D discovery signal and a communication system. Resources are selected by limiting the number of times of transmission or limiting a time interval, thereby avoiding malignant contention, and improving resource utilization; and resources are selected by calculating positions of the resources, thereby accurately performing detection, and lowering complexity of the UE.

According to an aspect of the embodiments of the present disclosure, there is provided a method for transmitting a D2D discovery signal, including:

selecting a part of resources by a UE from a resource pool for transmitting a D2D discovery signal; wherein, the part of resources is/are selected in a manner of limiting number of times of transmission, or in a manner of limiting time interval, or in a manner of calculating a resource position; and transmitting the D2D discovery signal by using the selected part of resources.

According to another aspect of the embodiments of the present disclosure, there is provided an apparatus for transmitting a D2D discovery signal, including:

a resource selecting unit configured to select a part of resources from a resource pool for transmitting a D2D discovery signal; wherein, the part of resources is/are selected in a manner of limiting number of times of transmission, or in a manner of limiting time interval, or in a manner of calculating a resource position; and a signal transmitting unit configured to transmit the D2D discovery signal by using the selected part of resources.

According to a further aspect of the embodiments of the present disclosure, there is provided a communication system, including:

a first UE configured to select a part of resources from a resource pool for transmitting a D2D discovery signal; wherein, the part of resources is/are selected in a manner of limiting number of times of transmission, or in a manner of limiting time interval, or in a manner of calculating a resource position; and transmit the D2D discovery signal by using the selected part of resources; and a second UE configured to perform blind detection according to the resource pool for transmitting the D2D discovery signal to receive the D2D discovery signal, or configured to receive the D2D discovery signal in a selected resource in a manner of calculating a resource position.

According to still another aspect of the embodiments of the present disclosure, there is provided a computer-readable program, wherein when the program is executed in a UE, the program enables the UE to carry out the method for transmitting a D2D discovery signal as described above.

According to still another aspect of the embodiments of the present disclosure, there is provided a storage medium in which a computer-readable program is stored, wherein the computer-readable program enables a UE to carry out the method for transmitting a D2D discovery signal as described above.

An advantage of the embodiments of the present disclosure exists in that resources for transmitting a D2D discovery signal are selected by limiting the number of times of transmission or limiting a time interval, thereby avoiding malignant contention, improving resource utilization, and lowering a probability of non-discovery between the UEs; and resources for transmitting a D2D discovery signal are selected by calculating positions of the resources, thereby accurately performing detection, and lowering complexity of the UE.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
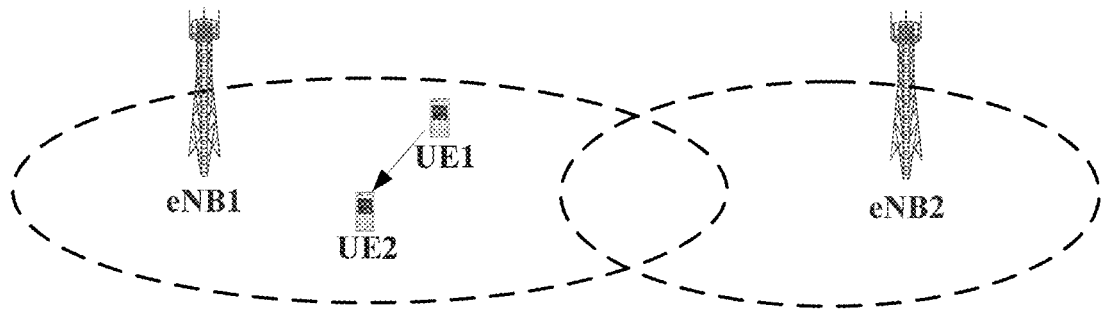
FIG. 1 is a schematic diagram of D2D communications in the relevant art.
Figure 2:
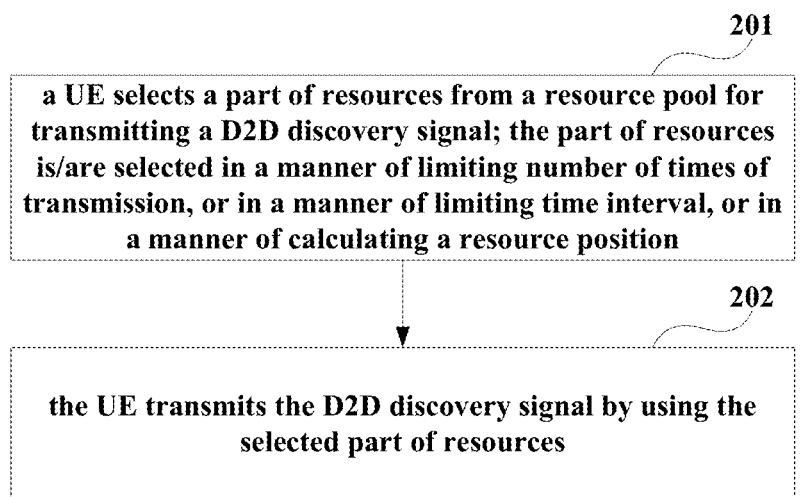
FIG. 2 is a flowchart of the method for transmitting a D2D discovery signal of an embodiment of the present disclosure.

An embodiment of the present disclosure provides a method for transmitting a D2D discovery signal, which is described from a UE side of a transmitter end performing D2D communications. FIG. 2 is a flowchart of the method for transmitting a D2D discovery signal of the embodiment of the present disclosure. As shown in FIG. 2, the method includes:

step 201: a UE selects a part of resources from a resource pool for transmitting a D2D discovery signal; the part of resources is/are selected in a manner of limiting number of times of transmission, or in a manner of limiting time interval, or in a manner of calculating a resource position; and step 202: the UE transmits the D2D discovery signal by using the selected part of resources.

In this embodiment, the resource pool for transmitting a D2D discovery signal may be configured by configuration information transmitted by a base station when the UE is in coverage of the base station, and may also be configured in advance when there exists no coverage of the base station, for example, the UE is configured in advance ex-works. However, the present disclosure is not limited thereto.

Figure 3:
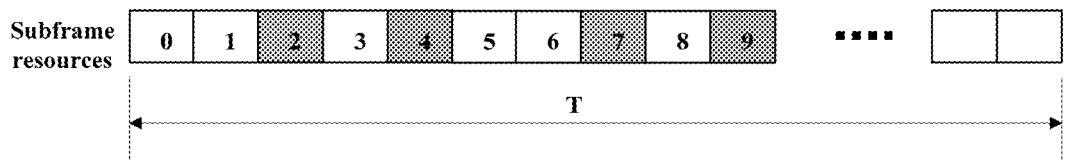
FIG. 3 is a schematic diagram of a resource pool of an embodiment of the present disclosure.

In this embodiment, the resource pool for transmitting a D2D discovery signal may include one of time-domain, frequency-domain or code-domain resources, or a combination thereof. FIG. 3 is a schematic diagram of the resource pool of the embodiment of the present disclosure. As shown in FIG. 3, there are multiple subframe resources in a period T, and a part of the resources (such as a 2nd, a 4th, a 7th and a 9th subframes) may be resources available for transmitting a D2D discovery signal, which may form a resource pool for transmitting a D2D discovery signal. And the UE may select a part of the resources (such as the 2nd and the 7th subframes) to transmit a D2D discovery signal.

It should be noted that FIG. 3 only schematically shows the resource pool for transmitting a D2D discovery signal; however, the present disclosure is not limited thereto. The resource pool may be one of a time-domain resource, a frequency-domain resource and a code-domain resource, or a combination thereof, and a particular content of the resource pool may be determined according to an actual situation. A part of resources in the resource pool (such as one or more subframe(s)) may be selected for transmitting a D2D discovery signal.

In this embodiment, the resource pool may be denoted by a bitmap. A length of the bitmap may denote the period T, 1 in the bitmap may denote available resources, and 0 in the bitmap may denote unavailable resources. The available resources denoted by the bitmap form the resource pool. The number of the available resources in the range of the period T can be seen from the bitmap, which may be denoted by m.

Alternatively, the resource pool may be denoted by parameters. The parameters may include a period value and the number of the available resources, or may include the period value, the number of the available resources and position information on the available resources. For example, a parameter period T and the number m of the available resources, may be configured for the UE, and particular positions of m available resources may be predefined, such as defining former m subframes in the range of the period T.

It should be noted that expression manners of the resource pool are schematically described above only; however, the present disclosure is not limited thereto. The present disclosure shall be further described below taking that the UE is covered by the base station as an example.

Figure 4:
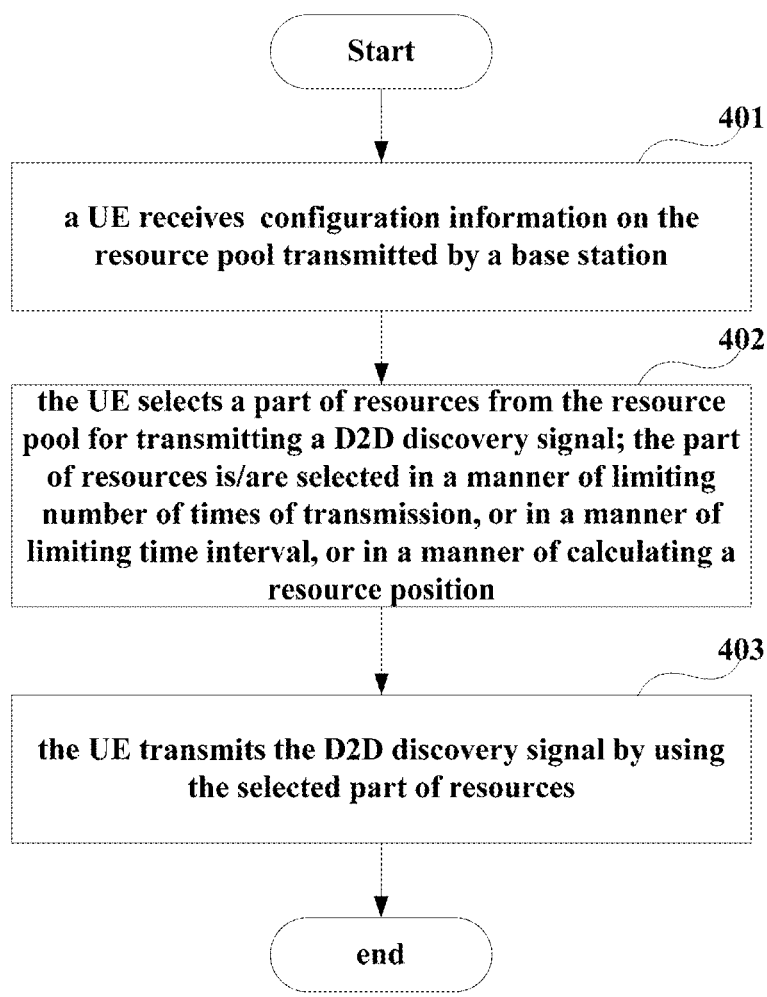
FIG. 4 is another flowchart of the method for transmitting a D2D discovery signal of the embodiment of the present disclosure.

FIG. 4 is another flowchart of the method for transmitting a D2D discovery signal of the embodiment of the present disclosure. As shown in FIG. 4, the method includes:

step 401: a UE receives configuration information on the resource pool transmitted by a base station.

In this embodiment, the resource pool may be configured by an operation administration and maintenance (OAM) entity for one or more base station(s).

Multiple base stations may be configured with the same resource pool, or multiple base stations may be configured different resource pools having overlapped resources; for example, positions of resources between neighboring base stations are ensured that there are overlapped parts; or multiple base stations may be configured different resource pools having no overlapped resources; for example, positions of resources between neighboring base stations are not overlapped.

In this embodiment, the base station may notify the configuration information of the resource pool to the UE in a broadcast or unicast manner; furthermore, the UE may receive an auxiliary parameter for selecting the part of resources transmitted by the base station; for example, besides the position information on the resource pool, other parameters may be contained, such as a maximum number of times of transmitting D2D discovery signals by the UE permitted in a time period, which may be denoted by n, or a minimum time interval between two times of transmitting D2D discovery signals, which may be denoted by t1.

Step 402: the UE selects a part of resources from the resource pool for transmitting a D2D discovery signal; the part of resources is/are selected in a manner of limiting number of times of transmission, or in a manner of limiting time interval, or in a manner of calculating a resource position.

In an implementation, a random selection manner may be used; and the UE randomly selects one or more subframe(s) from the resource pool (such as available subframe resources) for transmitting a D2D discovery signal.

In another implementation, the manner of limiting number of times may be used; in a case where the UE is covered by the base station, a network side may configure the UE with a limited number of times; for example, a maximum number of times of transmission of the UE in a time period (such as a cycle) is n; and in a case where the UE is not covered by the base station, the parameters may be predefined, and the UE may select resources in a period to transmit D2D discovery signals for at most n times according to the parameters.

In a further implementation, the manner of limiting time interval may be used; in a case where the UE is covered by the base station, the network side may configure the UE with a maximum time interval between two times of transmitting D2D discovery signals; for example, a maximum time interval between two successive times of transmitting D2D discovery signals is t1; and in a case where the UE is not covered by the base station, the parameters may be predefined, and the UE may select resources for transmitting a D2D discovery signal according to the parameters, so as to avoid that the time interval between two times of transmitting D2D discovery signals is less than t1.

In still another implementation, the manner of calculating a resource position may be used, which may include: determining one or more subframe position(s) by using ID of the UE, and determining positions of radio frames, so as to determine a part of resources in the resource pool.

Taking the manner of parameters of the resource pool as an example, the UE may learn parameters related to the resource pool which are configured based on the base station or preconfigured, including the period T and the number of available subframe resources in the range of the period T, the number being denoted by m.

In this implementation, the ID of the UE, UE_ID, may be ID uniquely identifying the UE; for example, it may be a cell radio network temporary identifier (C-RNTI), or proximity service (ProSe) UE_ID, or physical layer cell identity (PCI), or an evolved cell global identifier (ECGI); however, the present disclosure is not limited thereto, and other UE_ID may also be employed.

Furthermore, before being used, the UE_ID may be preliminarily processed; for example, UE_ID=UE_ID original mod 1024, that is, modulo operation is performed on original ID; and this scheme may be applied to selection of time-domain resources.

In this implementation, the method for determining one or more subframe position(s) by using the UE_ID may be as expressed in Table 1:

TABLE 1

(1) selecting a $q_0$-th subframe from m available subframes; where, m is the number of subframes in the resource pool, and $q_0$ is determined by using the formula below:
   $UE\_ID = m * p_0 + q_0, 0 \le q_0 < m$;
   where, UE_ID is the ID of the UE, and $p_0$ and $q_0$ are positive integers;
(2) selecting a $(1+q_1)$-th subframe in the m available subframes;
   where, $p_0 = m * p_1 + q_1, 0 \le q_1 < m$; and if $1+ q_1=m$, a 0-th subframe will be selected;
......
(i) selecting a $(1+q_{i-1})$-th subframe in the m available subframes;
   where, $p_{i-2} = m * p_{i-1} + q_{i-1}, 0 \le q_{i-1} < m$; and $2 \le i \le$ imax, $m^{(imax-1)} \le UE\_ID \le$
$m^{(imax)}$, $p_{i-1}$, $q_{i-1}$ and i being positive integers; and if $1+ q_{i-1}=m$, a 0-th subframe will be selected.

Following description shall be given by way of examples. Assuming that UE_ID=100, m=64, then $p_0$=1, $q_0$=36; a 36th subframe in the m available subframes may be selected for transmitting D2D discovery signals. It can be determined from UE_ID=100, m=64 that imax=2, thereby determining $p_1$=0, $q_1$=1; and furthermore, a 2nd subframe in the m available subframes may be selected for transmitting D2D discovery signals.

Assuming that UE_ID=100, m=8, then $p_0$=12, $q_0$=4; a 4th subframe in the m available subframes may be selected for transmitting D2D discovery signals. It can be determined from UE_ID=100, m=8 that imax=3, thereby determining $p_1$=1, $q_1$=4; and furthermore, a 5th subframe in the m available subframes may be selected for transmitting D2D discovery signals. And it may be determined that $p_2$=0, $q_2$=1, and a 2nd subframe in the m available subframes may be selected for transmitting D2D discovery signals.

In this implementation, determination of positions of the radio frames may be as follows: determining a first position of a time-domain resource for transmitting a D2D discovery signal as a system frame number (SFN), which is 0, and a subframe number is also 0. For the period T (less than 10240 ms), its unit might be assumed as millisecond (ms), and a starting point of a time-domain position of the resource for transmitting a D2D discovery signal satisfies (SFN*10 mod T)=0. However, the present disclosure is not limited thereto. For example, the positions of the radio frames may also be determined by using other methods.

In this implementation, imax time-domain resource positions may be totally obtained. If the UE is permitted to transmit a D2D discovery signal once in each period, the UE transmits D2D discovery signals once respectively in imax periods. And if the UE is permitted to transmit multiple D2D discovery signals in each period, the UE may occupy imax time-domain positions obtained by using the method shown in Table 1 in a period to transmit D2D discovery signals.

Step 403: the UE transmits the D2D discovery signal by using the selected part of resources.

In this embodiment, at the receiver end, the UE may perform blink detection according to the resources configured by the base station or preconfigured resources. Alternatively, if the transmitter end transmits D2D discovery signals in the manner of calculating a resource position, the UE of the receiver end may learn a particular position of the UE for transmitting the D2D discovery signals according to the configured parameters and the method shown in Table 1, and may receive the D2D discovery signals at accurate time-domain positions.

It can be seen from the embodiment that the resources are selected by limiting the number of times of transmission or limiting a time interval, thereby avoiding malignant contention of resources, improving resource utilization, and lowering a probability of non-discovery between the UEs; and resources are selected by calculating positions of the resources, thereby accurately performing detection, and lowering complexity of the UE.

Embodiment 2

An embodiment of the present disclosure provides an apparatus for transmitting a D2D discovery signal, which may be configured in a UE. This embodiment corresponds to the method for transmitting a D2D discovery signal described in Embodiment 1, with identical contents being not going to be described herein any further.

Figure 5:
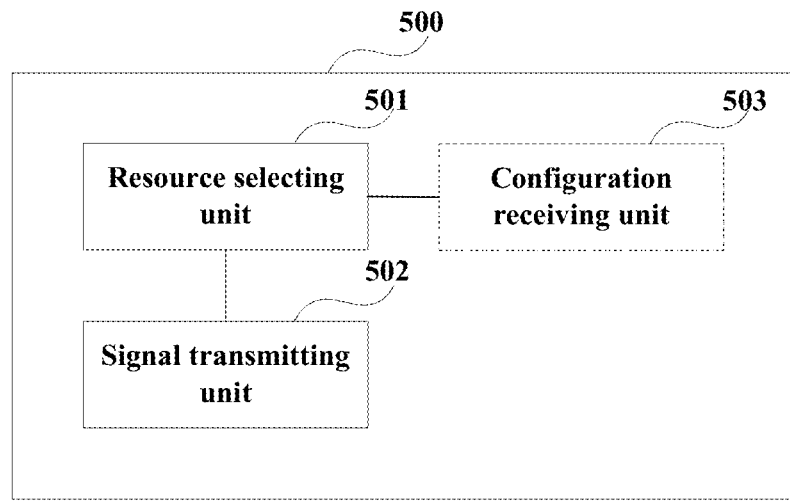
FIG. 5 is a schematic diagram of a structure of the apparatus for transmitting a D2D discovery signal of an embodiment of the present disclosure.

FIG. 5 is a schematic diagram of a structure of the apparatus for transmitting a D2D discovery signal of the embodiment of the present disclosure. As shown in FIG. 5, the apparatus 500 for transmitting a D2D discovery signal includes: a resource selecting unit 501 and a signal transmitting unit 502.

The resource selecting unit 501 is configured to select a part of resources from a resource pool for transmitting a D2D discovery signal; the part of resources is/are selected in a manner of limiting number of times of transmission, or in a manner of limiting time interval, or in a manner of calculating a resource position; and the signal transmitting unit 502 is configured to transmit the D2D discovery signal by using the selected part of resources.

As shown in FIG. 5, the apparatus 500 for transmitting a D2D discovery signal may further include: a configuration receiving unit 503 configured to receive configuration information of the resource pool transmitted by a base station. Furthermore, the configuration receiving unit 503 may be configured to receive an auxiliary parameter for selecting the part of resources transmitted by the base station.

In this embodiment, the resource pool may be denoted by a bitmap, or may also be denoted by a parameter; however, the present disclosure is not limited thereto.

In this embodiment, the part of resources may be selected from the resource pool in a random manner, or the part of resources may be selected from the resource pool by limiting the number of times of transmission, or the part of resources may be selected from the resource pool by limiting a time interval. Furthermore, the part of resources may be selected from the resource pool by calculating positions of the resources.

Figure 6:
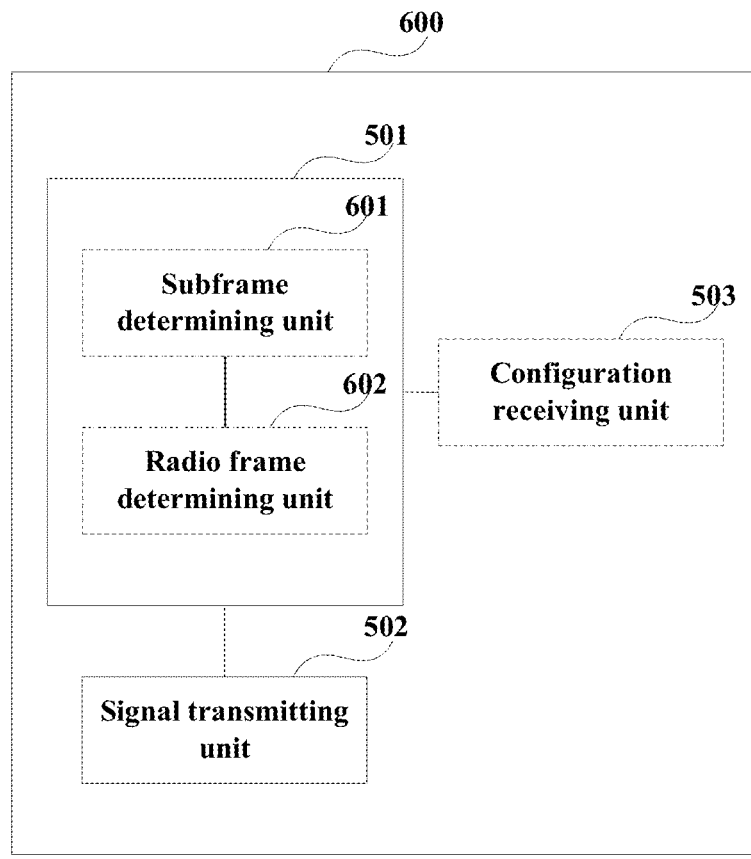
FIG. 6 is another schematic diagram of a structure of the apparatus for transmitting a D2D discovery signal of the embodiment of the present disclosure.

FIG. 6 is another schematic diagram of a structure of the apparatus for transmitting a D2D discovery signal of the embodiment of the present disclosure, in which the apparatus for transmitting in using the manner of calculating positions of the resources is shown. As shown in FIG. 6, the apparatus 600 for transmitting a D2D discovery signal includes: a resource selecting unit 501, a signal transmitting unit 502 and a configuration receiving unit 503.

The resource selecting unit 501 may further include a subframe determining unit 601 and a radio frame determining unit 602. The subframe determining unit 601 is configured to determine one or more subframe position(s) by using ID of the UE; and the radio frame determining unit 602 is configured to determine a position of a radio frame, so as to determine the part of resources in the resource pool.

In this embodiment, the apparatus for transmitting a D2D discovery signal may be configured in a UE.

Figure 7:
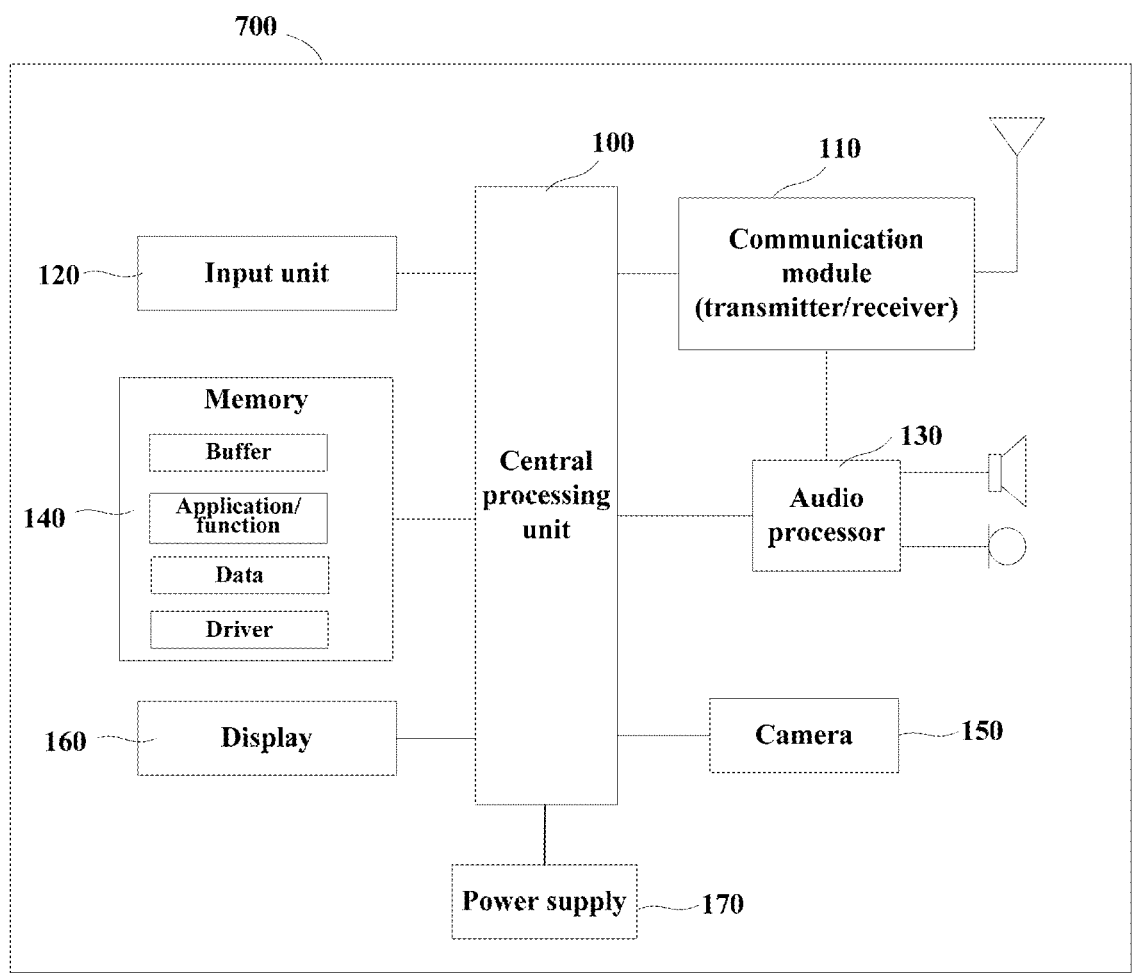
FIG. 7 is a block diagram of a systematic structure of the UE of an embodiment of the present disclosure.

FIG. 7 is a block diagram of a systematic structure of the UE of an embodiment of the present disclosure. As shown in FIG. 7, the UE 700 may include a central processing unit (CPU) 100 and a memory 140, the memory 140 being coupled to the central processing unit 100. It should be noted that this figure is illustrative only, and other types of structures may also be used, so as to supplement or replace this structure and achieve telecommunications function or other functions.

In an implementation, functions of the apparatus 500 or 600 for transmitting a D2D discovery signal may be integrated into the central processing unit 100. The central processing unit 100 may be configured to: select a part of resources from a resource pool for transmitting a D2D discovery signal; the part of resources is/are selected in a manner of limiting number of times of transmission, or in a manner of limiting time interval, or in a manner of calculating a resource position; and transmit the D2D discovery signal by using the selected part of resources.

In an implementation, the apparatus 500 or 600 for transmitting a D2D discovery signal and the central processing unit 100 may be configured separately. For example, the apparatus 500 or 600 for transmitting a D2D discovery signal may be configured as a chip connected to the central processing unit 100, with its functions being realized under control of the central processing unit 100.

As shown in FIG. 7, the UE 700 may further include a communication module 110, an input unit 120, an audio processor 130, a camera 150, a display 160, and a power supply 170. Functions of the above components are similar to those in the relevant art, which shall not described herein any further. It should be noted that the UE 700 does not necessarily include all the parts shown in FIG. 7, and the above components are not necessary; and furthermore, the UE 700 may include parts not shown in FIG. 7, and the relevant art may be referred to.

It can be seen from the embodiment that the resources are selected by limiting the number of times of transmission or limiting a time interval, thereby avoiding malignant contention of resources, improving resource utilization, and lowering a probability of non-discovery between the UEs; and resources are selected by calculating positions of the resources, thereby accurately performing detection, and lowering complexity of the UE.

Embodiment 3

An embodiment of the present disclosure provides a communication system, including the UE described in Embodiment 2.

Figure 8:
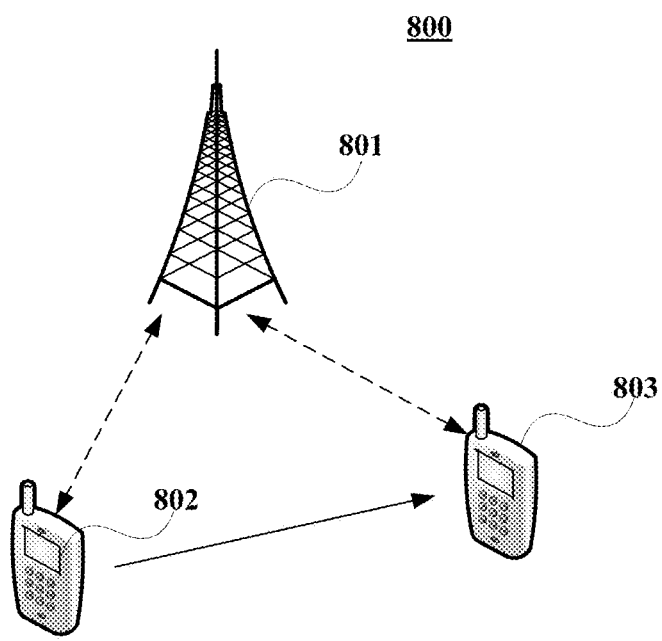
FIG. 8 is a schematic diagram of a structure of the communication system of an embodiment of the present disclosure.

FIG. 8 is a schematic diagram of a structure of the communication system of the embodiment of the present disclosure. As shown in FIG. 8, the communication system 800 includes a base station 801, a first UE 802 and a second UE 803. The first UE 802 may be the UE 700 described in Embodiment 2.

The first UE 802 is configured to select a part of resources from a resource pool for transmitting a D2D discovery signal; the part of resources is/are selected in a manner of limiting number of times of transmission, or in a manner of limiting time interval, or in a manner of calculating a resource position; and transmit the D2D discovery signal by using the selected part of resources;

and the second UE 803 is configured to perform blind detection according to the resource pool for transmitting the D2D discovery signal to receive the D2D discovery signal, or configured to receive the D2D discovery signal in a selected resource in a manner of calculating a resource position.

It should be noted that FIG. 8 shows a case where the first UE 802 and the second UE 803 are under coverage of the base station. However, the present disclosure is not limited thereto, and the first UE 802 and the second UE 803 may also not be covered the base station. Furthermore, the first UE 802 and the second UE 803 may be covered by different base stations, and a particular scenario may be determined according to an actual situation.

An embodiment of the present disclosure further provides a computer-readable program, when the program is executed in a UE, the program enables the UE to carry out the method for transmitting a D2D discovery signal as described in Embodiment 1.

An embodiment of the present disclosure provides a storage medium in which a computer-readable program is stored, the computer-readable program enables a UE to carry out the method for transmitting a D2D discovery signal as described in Embodiment 1.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. A method for transmitting a device-to-device (D2D) discovery signal, comprising:
    selecting, by a user equipment (UE), in a case where the UE is covered by a base station, a part of resources from a resource pool for transmitting a D2D discovery signal, wherein the resource pool is subframe resources denoted by a bitmap to each subframe and wherein the part of resources is selected, based on auxiliary information for selecting resources received from the base station, wherein the auxiliary information includes information indicating a number of times of transmitting the D2D discovery signal permitted in a time period, to perform transmission of the D2D discovery signal of the number of times of transmitting;
    selecting, in a case where the UE is not covered by the base station, resources based on predefined parameters; and
    transmitting the D2D discovery signal by using the selected part of resources.

2. The method according to claim 1, wherein the method further comprises:
    receiving configuration information on the resource pool transmitted by the base station.

3. The method according to claim 1, wherein a plurality of base stations including the base station are configured with identical resource pools, or the plurality of base stations are configured with different resource pools having overlapped resources, or the plurality of base stations are configured with different resource pools having no overlapped resource.

4. The method according to claim 1, wherein a length of the bitmap denotes a period, 1 in the bitmap denotes available resources, and 0 in the bitmap denotes unavailable resources, the available resources denoted by the bitmap forming the resource pool.

5. A user apparatus for transmitting a device-to-device (D2D) discovery signal, comprising:
    a memory that stores a plurality of instructions;
    a processor coupled to the memory and configured to execute the instructions to:
    select, in a case where the UE is covered by a base station, a part of resources from a resource pool for transmitting a D2D discovery signal, wherein the resource pool is subframe resources denoted by a bitmap to each subframe and wherein the part of resources is selected, based on auxiliary information for selecting resources received from the base station, wherein the auxiliary information includes information indicating a number of times of transmitting the D2D discovery signal permitted in a time period, to perform transmission of the D2D discovery signal of the number of times of transmitting; and
    select, in a case where the UE is not covered by the base station, resources based on predefined parameters; and a signal transmitter configured to transmit the D2D discovery signal by using the selected part of resources.

6. The user apparatus according to claim 5, wherein the processor is further configured to execute the instructions to receive configuration information of the resource pool transmitted by the base station.

7. A communication system, comprising:
a first user equipment (UE) configured to:
select, in a case where the UE is covered by a base station, a part of resources from a resource pool for transmitting a device-to-device (D2D) discovery signal, wherein the resource pool is subframe resources denoted by a bitmap to each subframe and wherein the part of resources is selected, based on auxiliary information for selecting resources received from the base station, wherein the auxiliary information includes information indicating a number of times of transmitting the D2D discovery signal permitted in a time period, to perform transmission of the D2D discovery signal of the number of times of transmitting;
select, in a case where the UE is not covered by the base station, resources based on predefined parameters; and
transmit the D2D discovery signal by using the selected part of resources; and
a second UE configured to perform blind detection according to the resource pool for transmitting the D2D discovery signal to receive the D2D discovery signal.

8. A base station controlling device-to-device (D2D) communications between user apparatuses, comprising:
a transmitter configured to transmit, to a user apparatus transmitting a D2D discovery signal, information indicating a resource pool for transmitting the D2D discovery signal, wherein the resource pool is subframe resources denoted by a bitmap to each subframe, and information indicating auxiliary information for a user apparatus,
the user apparatus selecting a part of resources received from the base station, wherein the auxiliary information includes information indicating a number of times of transmitting the D2D discovery signal permitted in a time period, wherein in a case where the user apparatus is covered by the base station, the subframe resources is used to select resources to transmit the D2D discovery signal, and wherein in a case where the user apparatus is covered by the base station, the information indicating a number of times of transmitting is used to select a number of times of transmitting of the D2D discovery signal.

* * * * *